United States Patent

Wyles

[15] 3,636,804
[45] Jan. 25, 1972

[54] MACHINE TOOLS

[72] Inventor: Raymond Allen Wyles, Windsor, Berkshire, England

[73] Assignee: William Owen McKenzie Jones, Hurley, Berkshire, England

[22] Filed: June 20, 1969

[21] Appl. No.: 835,199

[30] Foreign Application Priority Data

June 20, 1968 Great Britain......................29,486/68

[52] U.S. Cl. .................................82/21, 82/34 D, 408/11
[51] Int. Cl. .....................................................B23b 25/06
[58] Field of Search .................82/34.4, 21.1; 77/25, 34.5; 29/65; 408/11

[56] References Cited

UNITED STATES PATENTS

| | | | |
|---|---|---|---|
| 1,649,695 | 11/1927 | Higgins | 29/65 X |
| 2,565,305 | 8/1951 | Godfriaux | 82/21.1 X |
| 2,648,237 | 8/1953 | Falconi | 82/34.4 X |
| 3,037,404 | 6/1962 | Burg | 77/25 X |

FOREIGN PATENTS OR APPLICATIONS

| | | | |
|---|---|---|---|
| 295,163 | 4/1965 | Netherlands | 82/34.4 |
| 374,528 | 2/1964 | Switzerland | 82/28 B |

Primary Examiner—Leonidas Vlachos
Attorney—Davis, Lucas, Brewer & Brugman

[57] ABSTRACT

A rotatably indexable tool-programming drum for use in a machine tool having a rectilinearly reciprocal tool carrying assembly movable exteriorly over the length of the drum which carries one or more removable strip members having plural outwardly projecting and selectively positioned block members therealong, one of which has an end surface engageable with stop means on the tool carrying assembly for limiting the stroke of the assembly; the second of which has an outer cam surface engageable with follower means on the assembly and actuatable for changing the rate of rectilinear movement of the assembly from rapid traverse to tool feed rate, and a third of which carries adjustable projections engageable with means actuated thereby for regulating the rotational speed of a workpiece in the machine tool and the feed rate of a work tool engaged with the workpiece; each strip member being removable from the drum for presetting of the block members in predetermined relative positions remotely of the machine tool as determined by a predetermined operating program and movements for an associated work engaging tool.

5 Claims, 8 Drawing Figures

Fig. 1.

Inventor
Raymond Allen Wyles
By Dowell Dowell
Attorneys

MACHINE TOOLS

This invention relates to machine tools, and in particular to a device to control, for example, the movement and the stroke of a moving member such as the tailstock, headstock or the saddle of the machine tool. In this specification I shall refer to this moving member as an "assembly."

In accordance with the invention a device for controlling the stroke of an assembly (as hereinbefore defined) on a machine tool comprises one or more removable setting strips each of which is adapted to be located and held against a first reference surface on the device and whose end abuts a second reference surface which is perpendicular to the first reference surface, means being provided on each setting strip for locating a stop block in a selected position.

The stop block is conveniently arranged to be capable of being located at one of a number of positions along the strip and where it is engaged positively with a slot or land formed on the strip, which is preferable, means for fine adjustment of the stop being essential. This means may comprise either a screw adjustment on the stop, or, alternatively, the fine adjustment may be made by varying the spacing of the part of the strip on which the block is mounted from the second reference surface.

A very suitable form for the strip is one which presents a surface formed with a ratchet with which stops formed with mating teeth can engage.

In another embodiment the strip is formed in two parts, a first part having the projections or recesses formed on it, and a second part which is arranged to abut the flange or surface on the drum being connected to the first part of a vernier screw adjustment to allow the stop positions to be set at any position relative to the reference surfaces, intermediate the spaced intervals. This also means that the projections or recesses on the strips do not have to be very accurately located as the fine adjustment is achieved by means of the adjustment screw. In order to obtain simple registration of the stop-sensing mechanism on the machine tool with a projection on the strip a block is attached to the strip in abutment with one of the projections or recesses on the strip to present a protruding face which the stop-sensing mechanism can engage.

By enabling the strips to be removed from the drum and set up apart from the machine tool so that on being affixed to the drum in the proper position, no further adjustment of the end stops limiting the travel of the assembly is normally necessary.

The drum has as many positions for the strips as there are tool stations, and is indexed between each operation so that the appropriate strip presents corresponding stop face or faces to the stop sensing mechanism on the assembly. The drum may conveniently be rotated by means of a ratchet mechanism and indexed in position by means of a plunger which engages in an accurately formed hole in the flange at one end of the drum.

The use of a strip for a stop mechanism enables a further block to be attached to present a sloping face which triggers a switch mounted on the machine tool to retard the tool drive from a rapid traverse to a "feed" speed.

In accordance with a further feature of the invention the second part of the strip is provided with adjustable stops or cams which engage control members on the machine tool to control the speed of rotation of the workpiece and/or the speed of feed of the tool. As these two factors may vary for each operation to be performed they can be preset on the strip remote from the machine tool with the result that the tooling changeover time can be still further reduced. Each stop may comprise simply a button screw-threadedly engaging the second part of the strip and having a locknut to hold it fact once it has been set. Ideally, the button engages a pivotally mounted lever which amplifies the relative position of the button to a reference plane, and actuates a fluid-operated control valve. Where the feed and the speed are hydraulic or air operated the valve can be placed directly in the high pressure fluid line to the chuck or feed drive motor respectively.

In order to prevent wear or fouling of the buttons, or the studs on the levers which they engage, the levers are disengaged from the buttons as the drum is rotated.

The invention also extends to the combination of a stop drum for attachment to a machine tool and having a number of slots or recesses and slides or other stop holder provided with stop members for engagement in the slots.

A stop mechanism in accordance with the invention is particularly suitable for use on a machine tool having the conveyor tool system described in the copending U.S. Pat. application Ser. No. 750,408, filed July 3, 1968.

The invention will now be further described by way of example with reference to the accompanying drawings, in which.

The stop device is generally shaped as a drum indicated at 10 having 10 removable strips 12 attached in axial lines extending along the outer surface of the drum 10. Each strip 12 carrier blocks 14, 16 which act as adjustable stops.

The drum is mounted so that it can be rotated in 10 equal steps through one complete revolution and indexed between each step to present one of the strips in a position in which it is aligned with a part of a tool-carrying assembly 20. The blocks 14, 16 are then operative to control the movement and stop position of the tool assembly.

In both of the embodiments each of the strips 12 is mounted on the drum by engaging it with their respective location means on the drum face which acts as a first reference surface (each strip and each drum face is marked to correspond) so that it abuts a second reference surface 22 provided by one face of a fixed flange 24 at one end of the drum. The strip is then clamped by tightening a screw 26 at the other end of the drum, which engages within a keyhole slot 28 in the strip.

The strip also has two adjustable stops 30, 32 which actuate hydraulic and pneumatic valves on the body of the machine tool to control the tool feed and speed of rotation of the workpiece respectively for each cutting operation.

Figure 1:
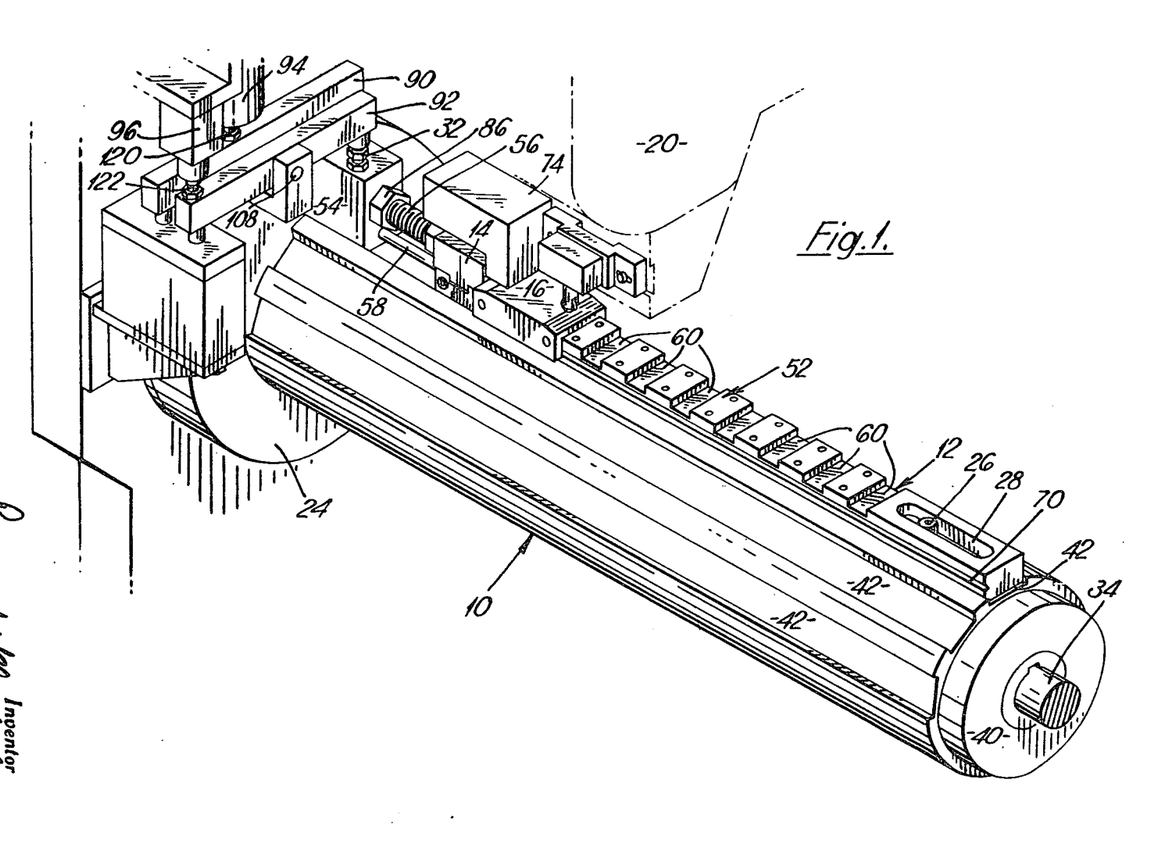
FIG. 1 is a perspective view of a stop device in accordance with the invention.
Figure 2:
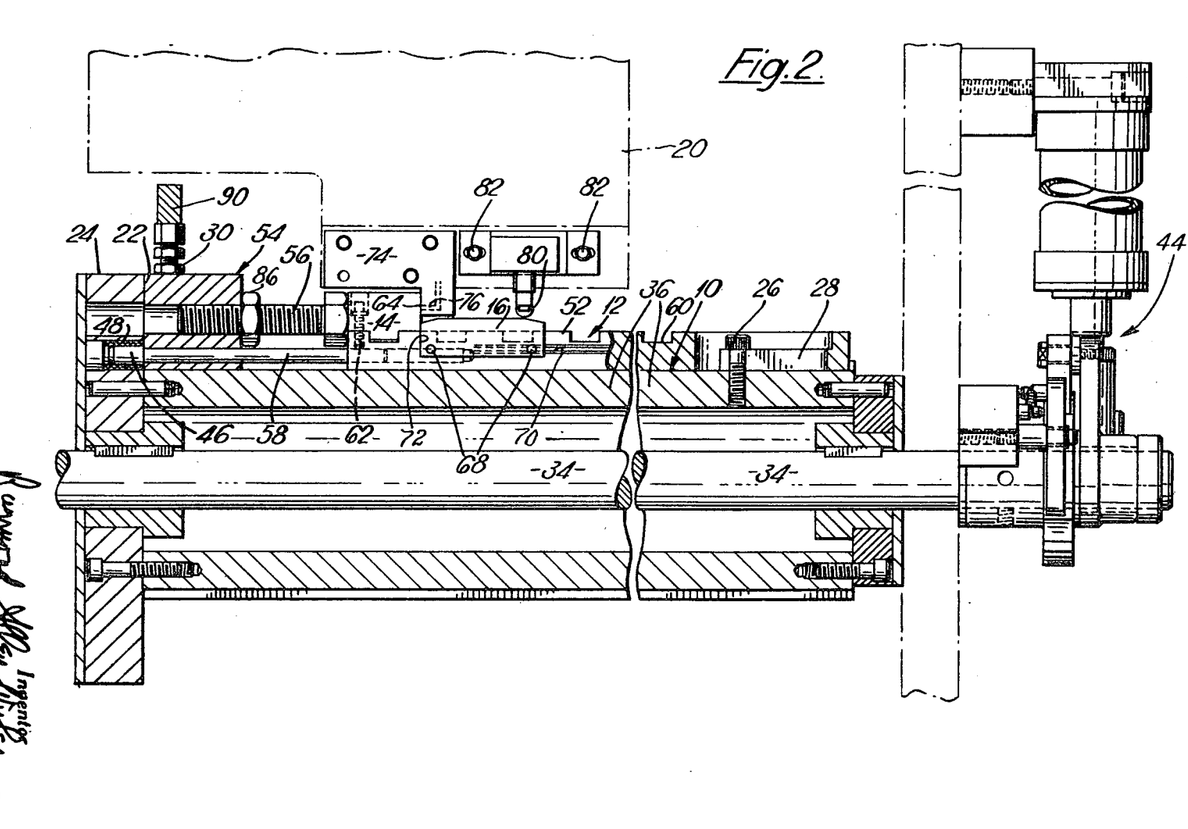
FIG. 2 is a sectional side elevation of the stop device of FIG. 1 taken through its centerline.

Referring to FIGS. 1 and 2 the drum is rotatably mounted on the base structure of the machine tool by means of a concentric spindle 34 to which it is keyed at either end. The drum 10 itself comprises a thick, rigid cylinder 36 having 10 axial slots 42 formed accurately in its outer surface and is closed by the fixed flange at one end, its other end being closed by an annular disc 40 which is keyed to the spindle 34.

The drum is rotated by a ratchet and pawl mechanism 44 attached to the right-hand end of the spindle 34 and which is later described in detail.

One of the strips 12 is mounted at each of the 10 slots 42 spaced around the periphery of the drum by placing it in its respectively numbered slot so that the keyhole slot 28 at its right-hand ends engages the screw 26 and a peg 46 projecting from its other end engages a hole 48 in the flange 24 (see FIG. 2). The strip 12 is then pushed to the left until it engages the reference surface 22 of the flange 24.

The strip 12 is formed in two parts 52, 54 which are connected together by a screw adjustment 56 and are restrained from relative rotation by a bar 58 attached to one part and slidable within a bore in the other. The right hand or first part 52 has a series of equispaced recesses 60 formed in it to accept stop blocks 14 which are screwed or bolted in position by bolts 62 (see FIG. 2) to present an accurately positioned face 64. Another slightly longer block 16 having chamfered ends can be mounted on the strip 12 and being locked in position by means of screws indicated at 68 which engage within a track 70 on the side of the strip. The chamfered block 16 which does not engage the recesses 60, but merely slides over them to allow it to be positioned anywhere above the strips, is used to control the limit of quick traverse and is arranged so that the length of the feed stroke of a tool corresponds to the distance between the face 64 and the left-hand face 72 of the chamfered block 16 so that if positioned so that the face 72 abuts the face 64 (see FIG. 2), then substantially all the travel of the tool will be effected at the quick traverse speed. In order to adjust this dimension initially on the machine, the lengthwise position of a roller 80 which it operates can be altered by loosening its two clamping screws 82.

The operation of the stops is such that the tool assembly 20 has an abutment 74 which on engaging the block 14 stops the tool assembly completely. In order to prevent damage to the stop mechanism by an impact against the stop a small air bleed valve 76 is formed in the face of the abutment 74 so that as it approaches the block 14 the air bleed senses the block and actuates a valve which causes the feed drive means to be stopped. The assembly is then moved back from the workpiece and the next tool moved into the operative position and a corresponding rotation of the drum by means of the pawl and ratchet mechanism places the subsequent strip in position to control the operation of the next tool on the assembly 20.

As the speed of the assembly is merely reduced and not stopped at the end of its quick traverse, the chamfered block 16 does not project as far from the strip as the stop block 14 and the feed mechanism on the tool carrier is actuated by the engagement of the chamfered block 16 by the roller 80 which operates a pneumatic or hydraulic valve in the tool feed drive. Care must be taken to ensure that under no circumstances is a tool fed onto a workpiece at its quick traverse rate.

Figure 3A:
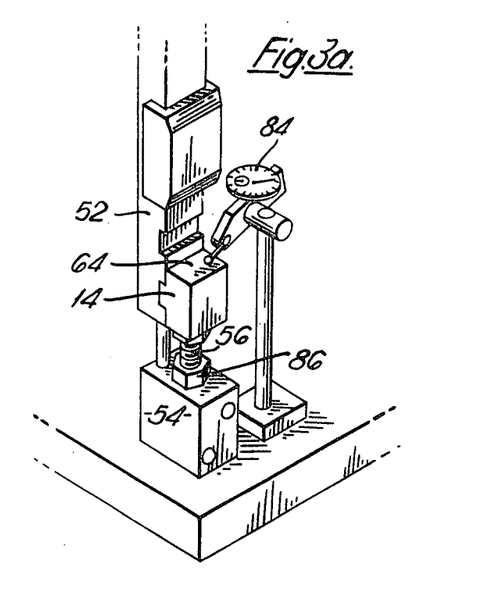
FIGS. 3a and 3b are sketches showing how a strip forming part of the device is preset remote from the machine tool.

When the stop block 14 has been attached to the strip 12 at a position remote from the drum and the machine tool at the recess closest to the desired stop position, a fine adjustment is made by means of the screw adjustment 56 by mounting it in position on a measuring table as shown in FIG. 3a. The position of the face 64 of the block is checked by a dial gauge 84 as shown and when the block 14 is correctly positioned by adjustment of screw 56 a locking nut 86 on the screw is tightened, and the chamfered block is then attached to the strip leaving a space slightly in excess of the length of the feed stroke.

Figure 3B:
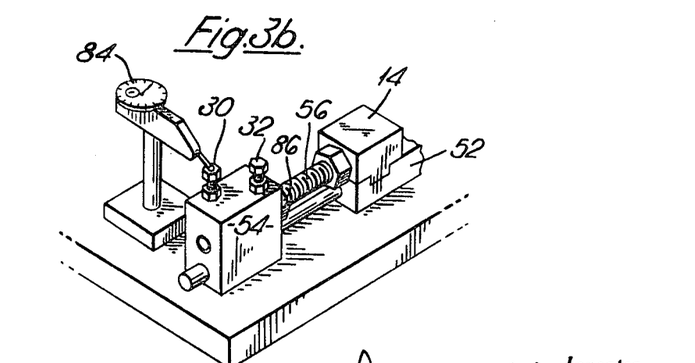

The left-hand part 54 of the strip carries two axially spaced dome-headed bolts or buttons 30,32 (see FIG. 3b); the button 32 governs the speed of rotation of the chuck or collet of the tool while the other 30 controls the speed of feed of the assembly 20. The buttons 30,32 are also preset on the measuring table using the dial gauge as shown in FIG. 3b. When the strip is in its operating position on the drum the buttons are engaged by two pivoted levers 90,92 respectively which are arranged to operate appropriate valves 94,96 (see FIG. 1).

Figure 4:
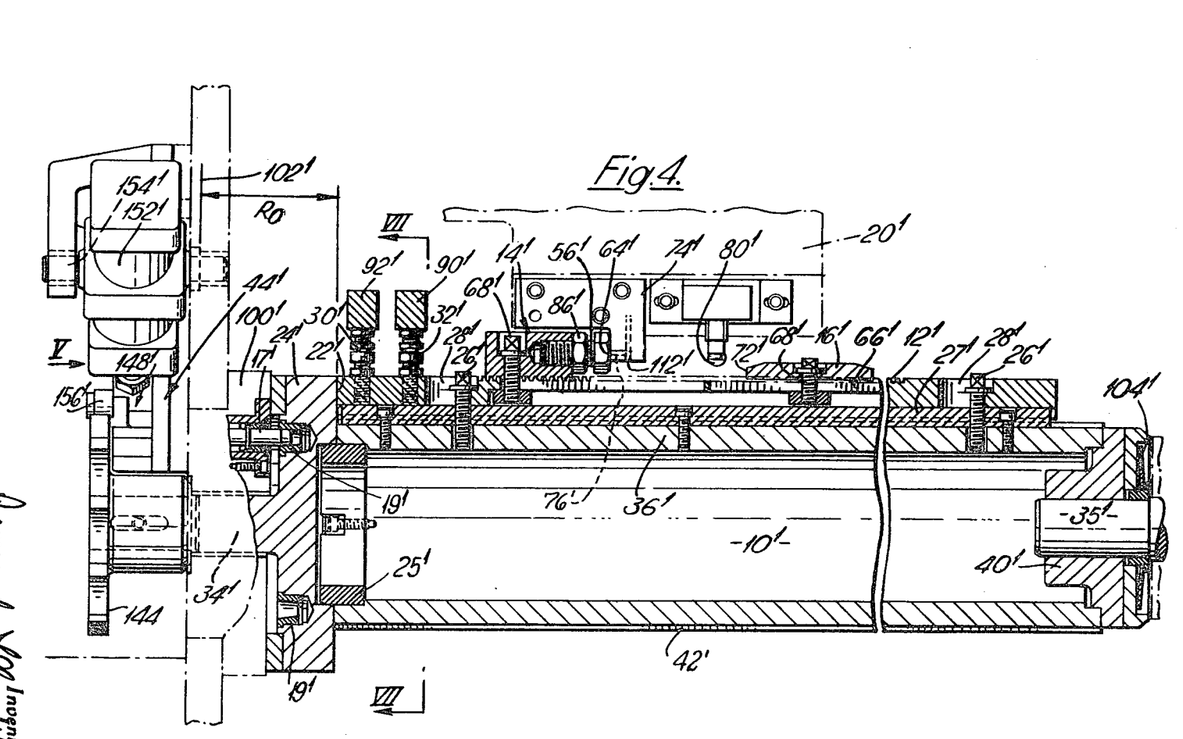
FIG. 4 shows an alternative embodiment of the stop device.

Turning now to FIG. 4, there is shown a modified construction of the drum which has been found to be somewhat cheaper to construct than the drum described above. For the sake of clarity and to avoid needless repetition as far as possible corresponding parts on the two embodiments have been assigned the same numerals but those relating to the drum of FIG. 4 have been primed, thus 10'.

The drum 10' differs slightly in its basic construction in that, although it comprises rigid cylinder 36' its supporting spindle is formed in two parts 34' and 35'; the latter being in effect a stub axle which engages the disc 40' which is bolted to the cylinder.

At the left-hand end the spindle 34' is formed integrally with the reference flange 24' which is located on the cylinder by means of a concentric sleeve 25'. The ratchet and pawl mechanism 44' (whose operation is described below) is keyed to the spindle 34'. The flange 24' is spaced from the body 100' of the pawl mechanism 44' by an annular ring which is machined in situ to achieve a reference dimension $R_o$, which is constant and of the same value for all machines of the same type, between the face 22' of the flange 24' and the part-off line 102'. A bellville washer 104' at the right hand end of the drum supplies a force of about 100 lbs. which insures that the flange is held tightly against the pawl body 100'.

The main difference between the device of FIGS. 4 and 7 and FIGS. 1 and 2 is that the strips 12' comprise a length of standard precision rack having a longitudinal slot formed in its underside which engages over one of 10 setting strips 27' accurately fixed into one of the longitudinal slots 42' formed around the periphery of the drum. The strip is held against the drum in abutment with the reference face 22' by means of two screws 26' engaging in key hole slots 28'. The stop block 14' is formed with a rack on its underside which mates with the rack or the strip 12' and is held in position by locking screws 68' extending through a slot 66' formed through the rack.

In setting up the strip, it is removed from the drum and placed on a measuring table in the same way as the strip 12. The block 14' is placed in engagement with the rack teeth as close to the desired position as the teeth permit and locked by means of the screw 68'. Fine adjustment of the stop is effected by means of the screw 56' which is locked by the nut 86'. Although in normal operation the stop does not have to withstand any great force as the tool feed is stopped as soon as the air bleed valve is actuated when the bleed orifice 76' is obstructed by the proximity of the stop face 64'.

The feed back block 16' which slides over the rack and can be positioned anywhere along the strip by tightening set screws $\epsilon'$ similar to those shown at 68 in FIG. 2, is so dimensioned that when its left-hand face 72' is in abutment with the face 64' of the block 14' all the travel of the assembly will be effected at the quick rate of traverse. Thus, in order to position the block 16' correctly, a distance slightly in excess of the required feed stroke is measured between the face 64' and the face 72' and the block 16' is then clamped in position. The block 16' is locked in position by the screw 68' which extends through a slot 66' formed longitudinally of the rack. The block 16' actuates the roller 80 as shown in FIG. 1. Alternatively, it is contemplated that an air bleed valve could equally well be used having an orifice formed in the underside 112' of the abutment 74' which is restricted as the abutment 74' passes over the block 16' thus actuating the tool drive mechanism to proceed at its slow feed rate.

The strip 12' is also provided at its left-hand end with two adjustable nuts or buttons 30',32' whose height relative datum line above the surface of the strip 12' is effective to control the tool feed and speed of rotation of the chuck (or spindle) of the machine tool. As each strip is provided with the buttons, the speed and feed can be adjusted separately for each individual cutting operation to provide the optimum cutting conditions.

As the buttons are provided on the removable strip they too can be preset at a position remote from the machine tool without having to stop the machine tool for any greater length of time than that required merely to fit the strips on the drum and clamp them in position against the reference face of the flange.

As the construction and operation of the feed and speed buttons 30,32 are substantially identical for the embodiments of FIGS. 1 and 2, and 4 and 7, the primes on the numerals will be omitted from the description but will be present where applicable in the drawings.

Figure 7:
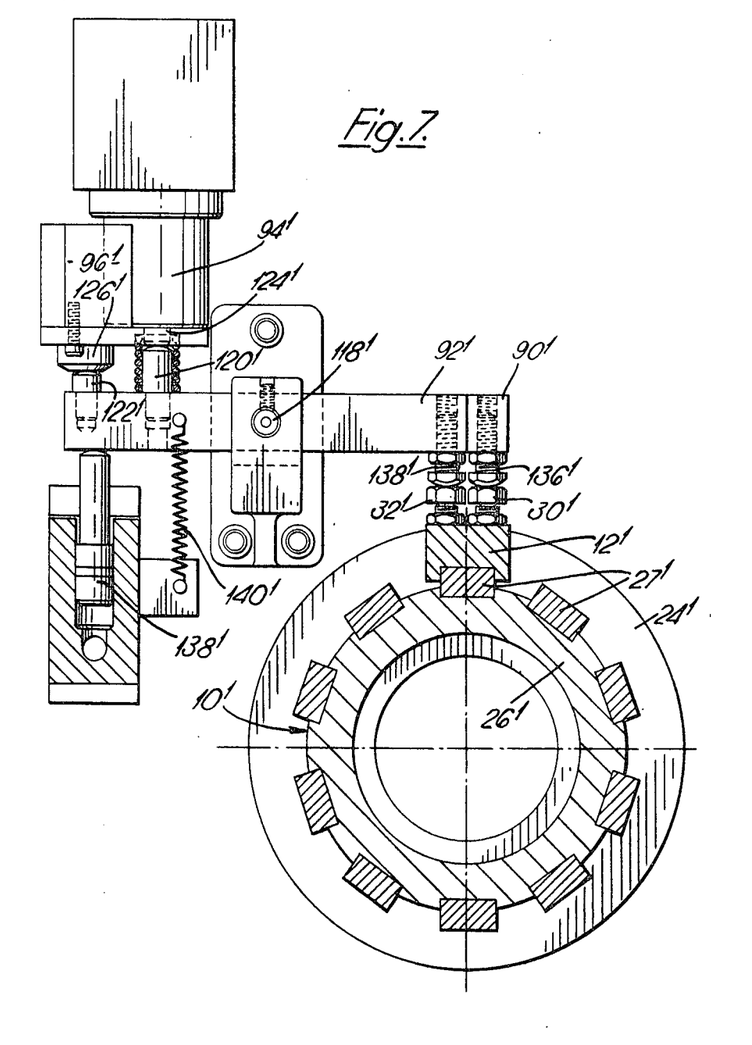
FIG. 7 is an end elevation of the stop device of FIG. 4 taken along line V11—V11.

As can best be seen from FIG. 7 the two buttons 30,32 are engaged by the levers, 90,92 which are pivoted at 118. At their other ends the levers are provided with pins 120,122 which operate pistons 124,126 of the valves 94,96 respectively controlling the feed and speed.

The feed control valve 94 is a flow control valve which directly controls the oil supply which drives the tool assembly 20 forward to effect the feed stroke. The speed control valve 96 however directly controls the air pressure which operates an infinately variable ratio gear box (not shown) in the spindle or chuck drive system. Thus, once the levers have been properly set up and adjusted, the height of the buttons 30,32 on each strip can be preset to control the feed and speed of each cutting operation (FIG. 3b).

The adjustment of the levers is effected by adjustment of the domed nuts 136,138 mounted on the levers 90,92 and which engage the buttons 30,32 when the system is first calibrated. In order to maintain the adjustment, the surfaces of the domed nuts 136,138 and the buttons is guarded by lifting the levers 90,92 before the drum is rotated. This is effected by releasing the air pressure from a small ram 138 which normally maintains each domed nut in engagement with its button in opposition to the tension of a spring 140.

Figure 5:
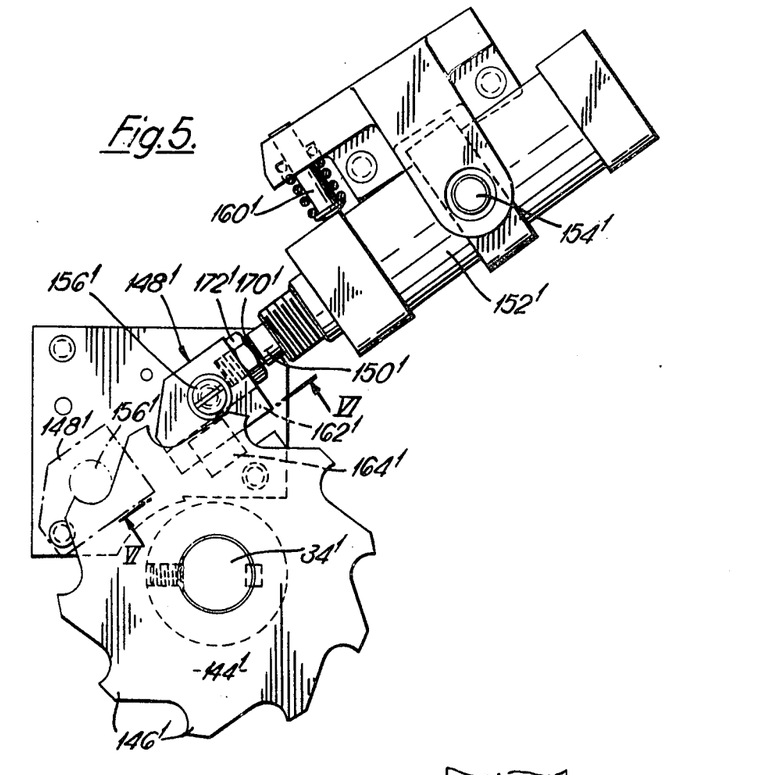
FIG. 5 is an end elevation taken in the direction of the arrow V in FIG. 4 of a ratchet device which is operative to rotate the drum through a desired angle.
Figure 6:
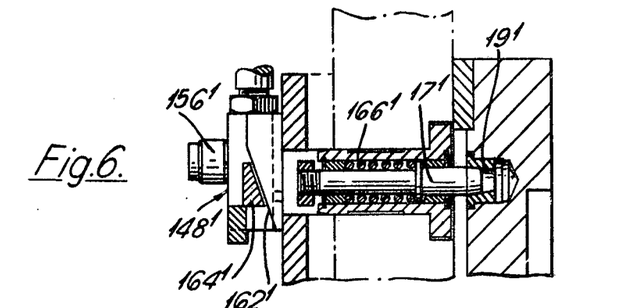
FIG. 6 is a view taken along the line V1—V1 looking in the direction of the arrows in FIG. 5.

The pawl and ratchet mechanism for rotating the drum and locating it in each of its 10 positions is shown in FIGS. 5 and 6. Like the feed and speed controls the construction of the rack and pawl mechanism 44 although mounted at the right-hand end of the drum in FIGS. 1 and 2 and on the left-hand end of the drum of FIG. 4, the same construction is suitable for both embodiments. That described, however, is the one which is fitted to the drum of FIG. 4.

A ratchet 144 having 10 teeth 146 is keyed to the spindle 34 and a pawl 148 is driven by a ram 150 mounted within a cylinder 152 pivotally mounted on the body of the machine tool at 154. The pawl has a roller 156 which is held in abutment with the ratchet by means of a spring 160.

The pawl also has a wedge portion 162 (FIG. 6) which in its rest position lies under a corresponding wedge 164 formed on the plunger 17 which engages with one of the tapered holes 19 to locate the drum precisely. The wedge 164 on the plunger which is loaded by a spring 166 to engage within the hole 19 firmly is designed normally to clear the wedge portion in the at rest position so that the plunger can always be driven home completely by the spring.

The teeth of the ratchet are so arranged that the roller rests near a crest in its at rest position. When the ram is extended the roller rolls along the left-hand side of the tooth while the wedge portion lifts the plunger out of the hole. By the time the roller engages the next tooth (further to the left) the plunger has been lifted clear of the hole and the drum is free to rotate to its next position at which the pawl is shown in dotted lines. At this position the plunger, being free of the wedge on the pawl, drops into the next hole in the drum and locks the drum in position. As the ram is retracted the roller causes the pawl to lift as it rides up over the crest (to the right) as the cylinder pivots. The pawl cannot drop down onto the next trough between the teeth because the side of the wedge portion is obstructed by the wedge on the plunger until it has reached its at rest position when the two wedges mate and allow the pawl to drop. Adjustment of the pawl is effected by means of a screw 170 and locknut 172 at the end of the ram.

The use of the drum stop device that I have just described makes it possible to preset the tool travel, the chuck or spindle speed rapid tool traverse and the feed rate on an automatic machine tool such as a lathe. In combination with the other preset tooling described in earlier copending patent application above referred to its use enables even the most complex machine tool to be preset at a place remote from the machine tool, in the majority of cases without any further need to set up on the machine tool at all.

I claim:

1. In a machine tool having a power driven, rectilinearly movable tool carrying assembly for moving work-engaging tools to and from workpieces, the combination comprising: a generally cylindrical drum supported adjacently parallel said assembly in a position permitting the latter to move lengthwise over the exterior of said drum, at least one elongated setting strip member mounted on the exterior of said drum and aligned parallel to the axis of rectilinear movement for said assembly, a stop block member mounted intermediate the ends of said strip member and having an adjustably positioned end surface extending outwardly of said drum for interfering abutment with a stop surface on said assembly whereby the latter's advancing movement toward a workpiece is limited upon interengagement of said end and stop surfaces, sensing means operably responsive to proximity of said surfaces to arrest the power drive means for moving said assembly at contact of such surfaces whereby to avoid heavy impact thereof, a second block member affixed to said strip member and mounting an adjustable first button projecting outwardly therefrom and engageable with a first feeler means associated with means operable to govern the tool feed rate of said assembly.

2. The invention of claim 1 in combination with: an additional block member slidingly secured to said strip member, clamp means for removably locking said additional block member in selected positions along the length of said strip member, said additional block member having an outer cam surface located rapidly outwardly of said strip member for periodic engagement by cam follower means mounted on and movable with said assembly and operatively associated with control means for changing the rate of advancing movement of said assembly; engagement of said follower means with said cam surface causing said rate to change from rapid traverse to tool feed rate; the position of said additional block member on said strip member being determined by selected lengths of the tool feed and rapid traverse stroke portions for the assembly.

3. The invention of claim 1, and a second adjustable button projecting outwardly of said second block member and engageable with second feeler means, said second feeler means being associated with means operable to control the rate of rotational movement of a workpiece in the machine tool.

4. The invention of claim 3 and resilient means for urging said feeler means into contact with their respective buttons when the drum is indexed to any of its operating positions, and means for disengaging said feeler means from said buttons whenever said drum is rotatably indexed.

5. The invention of claim 3, in which each said strip member has said block members and buttons thereon preset remotely of the machine tool to produce a selected predetermined operational program for a single work tool carried by said assembly in the mounted position of said strip member on said drum; the latter having two reference surfaces for accurately and consistently locating each said strip member in predetermined position on said drum.

* * * * *

PO-1050
(5/69)

UNITED STATES PATENT OFFICE
CERTIFICATE OF CORRECTION

Patent No. 3,636,804      Dated January 25, 1972

Inventor(s) RAYMOND ALLEN WYLES

It is certified that error appears in the above-identified patent and that said Letters Patent are hereby corrected as shown below:

IN THE SPECIFICATION:

Column 1, line 66, "fact" should be --fast--;

Column 4, line 25, "back" should be --start--;

Column 4, line 27, "6'" should be --68'--.

IN THE CLAIMS:

Claim 2, line 6, "rapidly" should be --radially--.

Signed and sealed this 15th day of August 1972.

(SEAL)
Attest:

EDWARD M. FLETCHER, JR.      ROBERT GOTTSCHALK
Attesting Officer      Commissioner of Patents